United States Patent
Marz

(10) Patent No.: US 6,382,110 B1
(45) Date of Patent: May 7, 2002

(54) CREMATION METHOD

(75) Inventor: Herbert Marz, Uhldingen (DE)

(73) Assignee: Messr. Griesheim GmbH, Frankfurt (DE)

( * ) Notice: Subject to any disclaimer, the term of this patent is extended or adjusted under 35 U.S.C. 154(b) by 0 days.

(21) Appl. No.: 09/147,548

(22) PCT Filed: Jul. 16, 1997

(86) PCT No.: PCT/EP97/03797

§ 371 Date: Apr. 23, 1999

§ 102(e) Date: Apr. 23, 1999

(87) PCT Pub. No.: WO98/03820

PCT Pub. Date: Jan. 29, 1998

(30) Foreign Application Priority Data

Jul. 17, 1996 (DE) .......................... 196 28 741

(51) Int. Cl.[7] .................................. F23G 1/00

(52) U.S. Cl. .................. 110/194; 110/188; 110/190; 110/204; 110/345; 110/341

(58) Field of Search ................. 110/188, 190, 110/194, 203, 204, 205, 206, 214, 233, 234, 242, 255, 341, 345, 346; F23G 1/00

(56) References Cited

U.S. PATENT DOCUMENTS

| | | | |
|---|---|---|---|
| 2,625,121 A | | 1/1953 | Vanderwerf |
| 3,749,031 A | * | 7/1973 | Burden, Jr. |
| 3,772,998 A | * | 11/1973 | Menigat .................. 110/204 X |
| 3,797,415 A | | 3/1974 | Young, Jr. et al. |
| 3,799,077 A | * | 3/1974 | Lowe ..................... 110/204 X |
| 3,815,523 A | * | 6/1974 | Gibeault ..................... 110/204 |
| 4,517,902 A | * | 5/1985 | Christian .................... 110/190 |
| 4,753,181 A | | 6/1988 | Sosnowski .................. 110/346 |
| 4,942,832 A | * | 7/1990 | Finke ......................... 110/190 |
| 5,179,903 A | * | 1/1993 | Abboud et al. ......... 110/204 X |
| 5,195,883 A | * | 3/1993 | Hanna et al. ........... 110/204 X |
| 5,309,850 A | * | 5/1994 | Downs et al. .......... 110/204 X |
| 5,402,739 A | | 4/1995 | Abboud et al. ............. 110/346 |
| 5,826,521 A | * | 10/1998 | Schumann et al. ..... 110/205 X |

FOREIGN PATENT DOCUMENTS

| | | |
|---|---|---|
| DE | 4100179 A1 | 7/1992 |
| DE | G9211554.3 | 10/1992 |
| DE | 4118261 C2 | 9/1993 |
| DE | G9407906.4 | 7/1994 |
| DE | G9407906.4 | 9/1994 |
| DE | 4313102 A1 | 10/1994 |
| DE | G9414301.3 | 2/1995 |
| EP | 0188853 A1 | 7/1986 |
| EP | 0562278 A2 | 9/1993 |

(List continued on next page.)

OTHER PUBLICATIONS

Patent Abstracts of Japan, vol. 095, no. 007, Aug. 31, 1995 & JP 07 103443 A (Media Corp.).
Blickpunkte, Energie, "Sauerstoff Senkt Schadstoff—Ausstob", vol. 42, No. 12, Dec. 1990, pp. 8 & 9.
Combustoren—Konstruktion und Anwendung, Ing. H. Eick, 01–und Gasfeuerung, Jan. 1972, pp 20, 22, 24–26.
Patent Abstracts of Japan, M–1021, Sep. 7, 1990, vol. 14, No. 416, Cremation Furnace 2–161204(A).

Primary Examiner—Ljiljana Ciric
(74) Attorney, Agent, or Firm—Jones, Tullar & Cooper, P.C.

(57) ABSTRACT

A method and installation for the cremation of bodies in coffins. The coffin is placed in a crematorium furnace in the wall of which at least one burner is disposed. Conbustion occurs in a chamber of the crematorium furnace without naturally-occurring air and with the burning of the coffin supplying energy along with part of the recirculated flue gas in which oxygen has been added. The flue gas fed back to the crematorium furnace is recirculated uncooled. The temperature at the crematorium furnace is maintained by the burning coffins and the oxygen-enriched recirculated flue gas.

19 Claims, 3 Drawing Sheets

FOREIGN PATENT DOCUMENTS

| | | | |
|---|---|---|---|
| EP | 0709622 A1 | | 5/1996 |
| GB | 2025028 A | | 1/1980 |
| GB | 2114722 A | * | 8/1983 |
| JP | 62-261814 | * | 11/1987 |
| JP | 6-313509 | * | 11/1994 |
| WO | WO 89/09912 | | 10/1989 |

* cited by examiner

CREMATION METHOD

FIELD OF THE INVENTION

The present invention relates to a method for the cremation of bodies in coffins m a crematorium furnace, in whose walls at least one burner is arranged, which is supplied with fuel, and wherein the removal of the flue gas being generated during the cremation takes place via a conduit, and an installation for the cremation of bodies in coffins.

BACKGROUND OF THE INVENTION

Today, such methods for cremation are subject to increased requirements for protecting the environment (i.e., 17th Federal Emission Protection Ordinance). This means that there are maximum values for the noxious material burden, which may not be exceeded. In accordance with the prior art, there is only the possibility of subjecting the flue gas released into the chimney to flue gas scrubbing. However, this is expensive. Often, it is not possible because of space considerations in the existing installations which are to be retrofitted.

Moreover, at the start of the combustion process, large amounts of carbon monoxide are generated by the burning of the coffin, which is made of wood, since because of the available portion of oxygen in the air used for the combustion, the amount of oxygen which would be required for the complete combustion of the carbon being generated in is phase of the cremation process is not available, even though at present operations are performed with air numbers of up to 3.5. Thus, at the start of burning, large loads of non-consumed CO are released. This is particularly unfortunate because CO leads to the formation of cancer-causing dibenzofuranes and dibenzodioxins.

Typically, the thermal output of such crematorium furnaces is approximately 550 to 600 KW, which corresponds to a net output of 60 standard cubic meters ($Nm^3$) of natural gas per hour. This means that at an air number of 3.5 approximately 2200 $Nm^3$ of flue gas per hour are being produced. The downstream-connected flue gas scrubbing components must be dimension correspondingly large.

The retrofitting of exiting installations which is demanded today is also problematic, because the existing crematoria are classified as historical monuments, so that structural changes are very difficult or even impossible to undertake.

The considerable amount of flue gas heat being created causes a further problem. While in some countries the waste heat is commercially used, this is not the case, for example in Germany, for reasons of piety.

A further problem of the flue gas in general lies in that nitrous oxides (NOx) are generated in the course of combustion with the use of natural air because of the heavy nitrogen content of the air (approximately 75%), and this at high air numbers in particular. This also makes the later cleaning of the waste gas necessary.

SUMMARY OF THE INVENTION

It is therefore an object of the present invention to further develop a method of the type mentioned at the outset in such a way that the noxious waste gases are reduced and the energy used increased. In the case of a retrofit, this should be achievable by possibly also increasing the efficiency of existing cremation installations.

This object is attained in accordance with the present invention in that cremation takes place in a crematorium furnace without a supply of natural air, in that at least half the flue gas leaving the crematorium furnace is conducted without being cooled to the crematorium chamber for creating a flue gas cycle, and in that oxygen is admixed with the flue gas in the flue gas cycle. The present invention fiber relates to several advantageous further developments.

BRIEF DESCRIPTION OF THE DRAWING

Exemplary embodiments in their advantageous further development will be described in greater detail in what follows, making reference to the drawings. Represented are in.

DESCRIPTION OF THE PREFERRED EMBODIMENT

Figure 1:
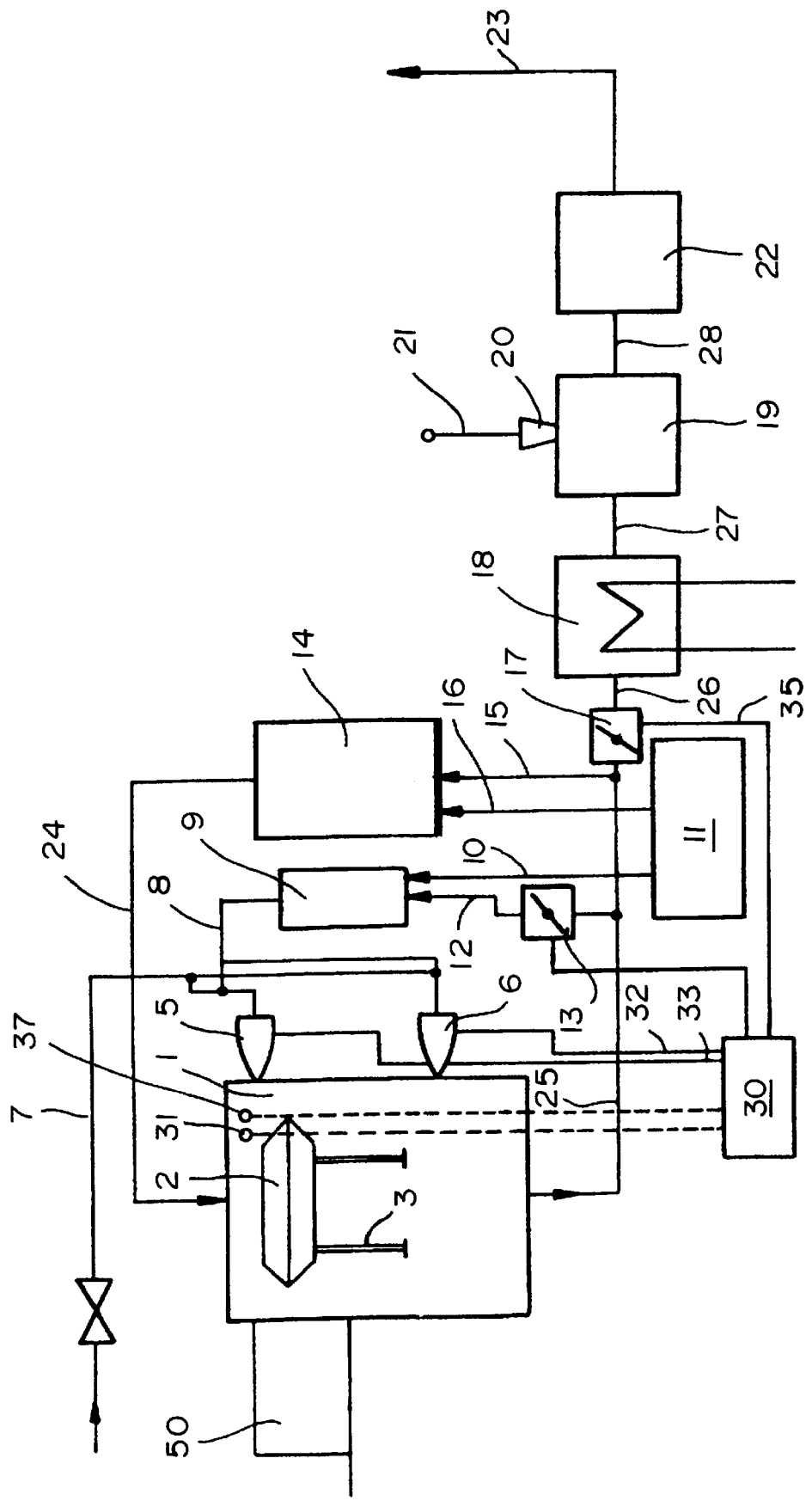
FIG. 1 is a first exemplary embodiment of a crematorium furnace for practicing the method.

FIG. 1 shows a crematorium furnace 1. It is designed as a so-called "double-deck" furnace. A coffin 2 with a body therein has been placed into it. The coffin has been put on supports 3. The coffin 2 is introduced through a flexible lock 50 (see FIG. 3 for details of this). Two burners 5 and 6 terminate in the walls of the furnace, which are supplied with support energy (for example natural gas) through a conduit 7, and with a mixture of oxygen and recirculated flue gas through a conduit 8. The mixer is prepared in a mixer 9. The mixer 9 is supplied with pure oxygen from an oxygen source, for example a reservoir 11, via a conduit 10, and with recirculated flue gas via a line 12 and a control flap 13. A conduit 25, from which the conduit 12 branches off, is the flue gas exhaust conduit of the crematorium furnace 1.

The installation furthermore contains another mixer 14. Recirculated file gas is also supplied to it via a conduit 15. It receives oxygen via a conduit 16. The conduit 15 is also connected with the conduit 25, which conducts the flue gas removed from the crematorium furnace 1, and with the oxygen source 11 via the conduit 16. The position of a control flap 17 provided downstream of the branch of the conduit 15 determines the proportion of recirculated flue gas. The amount of recirculated flue gas can be set such that it is approximately 75%. This corresponds approximately to the proportion of nitrogen in natural air. Thus, a mixture of artificial air, so to speak, is created. An amount of flue gas, preponderantly consisting of $CO_2$, which is determined by the amount of flue gas generated during combustion, is removed through conduits 26, 27, 28. Because no natural air, and therefore no nitrogen from the air, is a part of the combustion process anymore, only nitrogen, which might possibly be present in the fuel, can add to the formation of nitrous oxides. In this way, the amount of nitrous oxides being generated is considerably reduced in this way.

The amount of flue gas which is forced to escape out of the combustion cycle, is first conducted through the conduit 26 to a heat exchanger 18, and from there reaches a so-called "flow stream" reactor 19, which is supplied with an active scrubbing agent (for example "SORBALIT") (a mixture of calcium hydride and pulverized open hearth coke) via nozzles 20 through a conduit 21. Inter alia, the heat exchanger 18 is used for cooling the flue gas sufficiently, so that the highest permissible operating temperature of the reactor 19 is not exceeded. The pulverulent absorption agent supplied via the nozzles 20 is then cleaned again in a textile or "baghouse" filter 22 before the scrubbed flue gas escapes through a chimney 23.

As can already be seen from this description, a portion of the flue gas being generated during combustion in the crematorium furnace 1 and which can be adjusted by means of the position of the control flaps 13 and 17, is returned to the crematorium furnace, namely first via the conduit 25, the control flap 13, the conduit 12, the mixer 9, the conduit 8 and the burners 5, or respectively 6, and then via the conduit 25, the conduit 15, the mixer 14 and the conduit 24.

Differently from known combustion installations, the amount of oxygen required for burning the support energy (for example natural gas) is made available at the burners 5, or respectively 6, by the supply of artificially generated oxygen of a purity of at least 90% from an oxygen source 11, for example a reservoir, via the conduit 10 and the mixer 9.

The availability of "artificial" or "synthetic" air (i.e. the described mixture of recirculated flue gas and admixed oxygen) is moreover provided in a mixer 14, from which it reaches the crematorium furnace 1 directly—ie. without combustion in a burner—. This supply is used to satisfy the considerable need for oxygen, which cannot be satisfied by burning the wood of a coffin 2, in particular in the starting phase of the cremation process, and which normally, ie. when combustion takes place by the supply of air, cannot be satisfied by the limited proportion of oxygen in the air. As mentioned, with conventional crematorium furnaces in the starting phase this leads to a very high proportion of CO (carbon monoxide), since with natural air the amount of available oxygen is limited by the $O_2$ portion of the air of 21%. By making the oxygen available in an adjustable manner directly at the location where the wood of the coffin 2 is burned, the proportion of CO being generated is considerably lowered. The required energy for combustion is moreover supplied with the carbon portion of the wooden coffin, so that therefore at these locations and in this phase of the process no outside energy supply by means of a burner is required. On the one hand, this reduces the provision (amount) of supplied support energy (natural gas) by means of the burners and, on the other hand, lowers the proportion of carbon monoxide in the flue gas, or respectively reduces it to zero.

The reason why during this entire process not only pure oxygen is made available, but is admixed with recirculated flue gas, lies in that otherwise the temperature in the furnace chamber would become too high. The recirculated flue gas, predominantly composed of $CO_2$, assumes the cooling function as well as the heat transport function of the substituted nitrogen.

The flue gas return takes place without cooling. The result of this is that the additionally required heating of the furnace chamber by means of supplying support energy to the burners 5 and 6 can accordingly be set by means of correspondingly larger switch-on cycles. It is therefore possible to even turn off the burners partially, namely at the time when—at the start of the combustion process—the coffin 2 itself begins to burn. Thus, the maintenance of a high temperature by recirculation of the uncooled flue gas, as well as the simultaneous provision of oxygen, allow the temporary maintenance of the combustion process without activating the burners, i.e. without support energy. By means of this it is possible to save considerably more energy, both in connection with the support energy as well as in connection with the oxygen. Because of this a simultaneous reduction of the carbon dioxide being generated takes place, the latter being problematical in view of the environment because of the so-called greenhouse effect.

This increased utilization of the heat by means of a large return of heat in the cycle also compensates for the fact that, for reasons of piety, no utilization of the heat by heating other installations or by operating a cooling machine takes place with cremation installations of this type, even though appropriate additional installations represent advantageous fiber developments of the present invention. However, utilization of the waste heat during non-heating periods is problematical in any case.

The totality of the processes requires regulation as a function of the course of the combustion process. The latter takes place in a very fluctuating manner since, as mentioned, burning of the coffin takes place first. Then the cremation of the body starts. But this process to a large extent is an evaporation process, not a combustion process, since the human body consists to a large extent of water. It is therefore necessary in the starting phase to make much more oxygen available—as mentioned—than in the later phase of the combustion process, while at the same time considerable energy is made available in the first phase by burning the coffin 2, so that no additional supply of support energy is required. A control unit 30 is provided for regulating these processes, which is connected with one or several temperature sensors 31 and the CO sensor 37 and therefore detects at least the temperature in the crematorium furnace 1. The output of the burners 5 and 6 is regulated as a function of this via the control lines 32, 33, and the amount of recirculated flue gas by setting the control flaps 13, 17 via control lines 34, 35. If required, it is possibly provided to set the amount of oxygen released from the oxygen source 11 to the conduits 10, or respectively 16, separately and independently via the control unit. In the process, the CO in the flue gas is continuously measured by a CO sensor 37. The regulating variable affects the oxygen supply, or respectively concentration, in the furnace chamber.

A further advantage of the way to proceed proposed here results from dimensioning. While with conventional cremation the flue gas flow is approximately 2200 to 2500 NmrAh of flue gas, with the described cycle conditions it can be reduced by approximately one fourth, i.e. to 400 to 600 $Nm^3/h$ of flue gas. This allows a considerable reduction in new installations with a simultaneous increase in output. Moreover, retrofitting of existing installations in made considerably easier. The length of combustion is considerably reduced by the method in accordance with the present invention. While with conventional cremation the combustion in the starting phase is more a swelling process (CO formation), with the present invention the combustion process is considerably accelerated by the concentrated supply of oxygen. This is of great importance in view the increasing number of cremations.

In the normal case, the provision of artificially produced oxygen in reservoirs takes place in liquid form with an evaporation unit. However, it is also possible to provide an on-site installation for oxygen generation in accordance with the pressure change absorption, or respectively, diaphragm principles.

A further advantage of the represented way to proceed rests in a reduced amount of required operating means. The usually required catalytic nitrous oxide removal, for example by adding activated charcoal, "SORBALIT", etc. can be considerably reduced. Since combustion takes place without air, and therefore the generation of nitrous oxides approaches zero, scrubbing of the waste gas in the reactor 19 is essentially only used for removing the dibenzodioxin and dibenzofurane created in the cremation of the coffin and the body, as well as the poisonous materials created in the combustion of heavy metal, for example mercury (part of amalgam fillings), etc.

Figure 2:
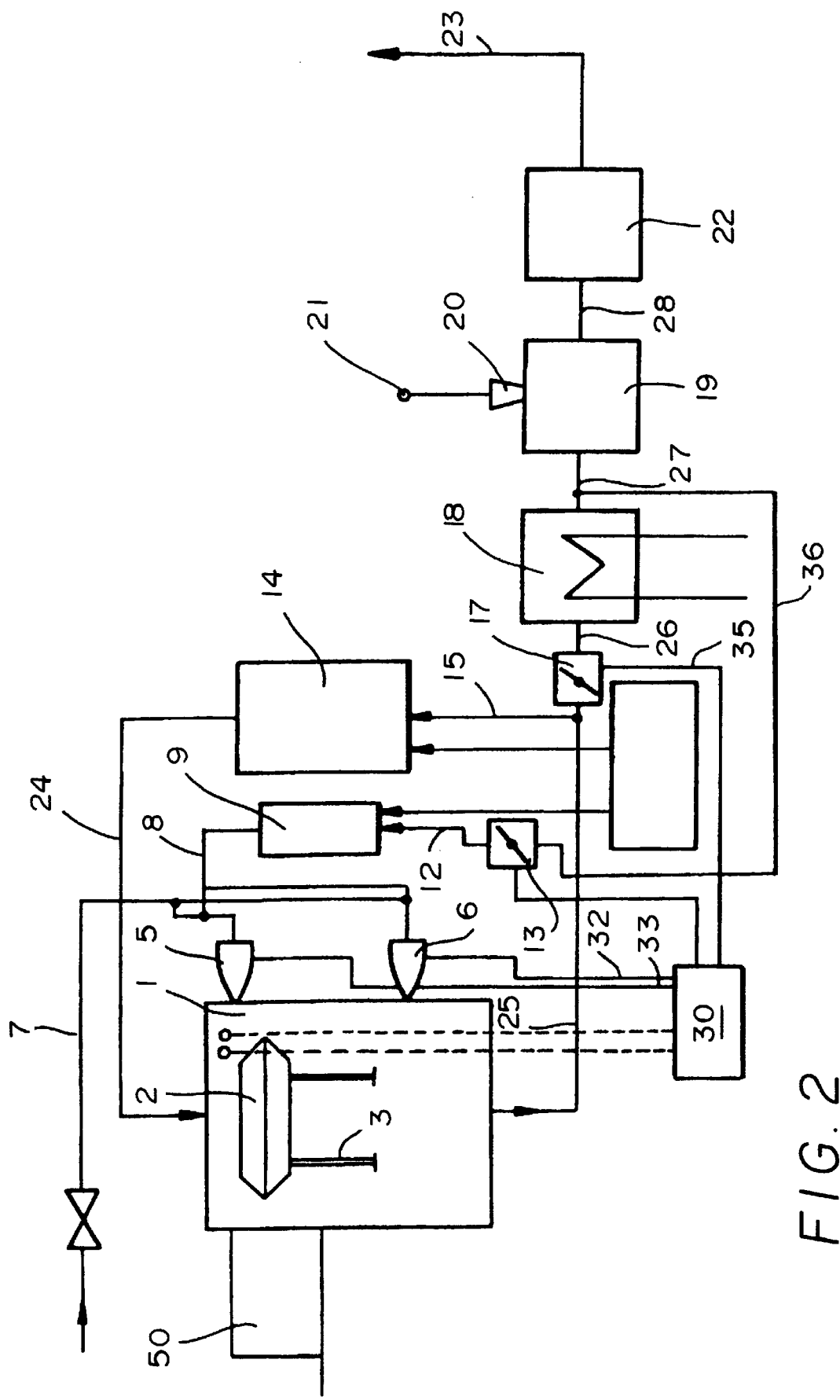
FIG. 2 is a second exemplary embodiment of a crematorium furnace for practicing the method.

FIG. 2 shows a further exemplary embodiment, which differs from the exemplary embodiment represented in FIG. 1 to the extent that the recirculation of flue gas takes place via the flap 13 and the mixer 9 to the burner 5, or respectively 6, only at a point downstream of the heat exchanger 18. This allows the employment of conventional burners, since cooled flue gas enters these. It is therefore not required to design the burners 5 and 6 for higher temperatures as in FIG. 1. Otherwise the flue gag circulation continue to take place via the conduit 15, the mixer 14 and the conduit 24.

Figure 3:
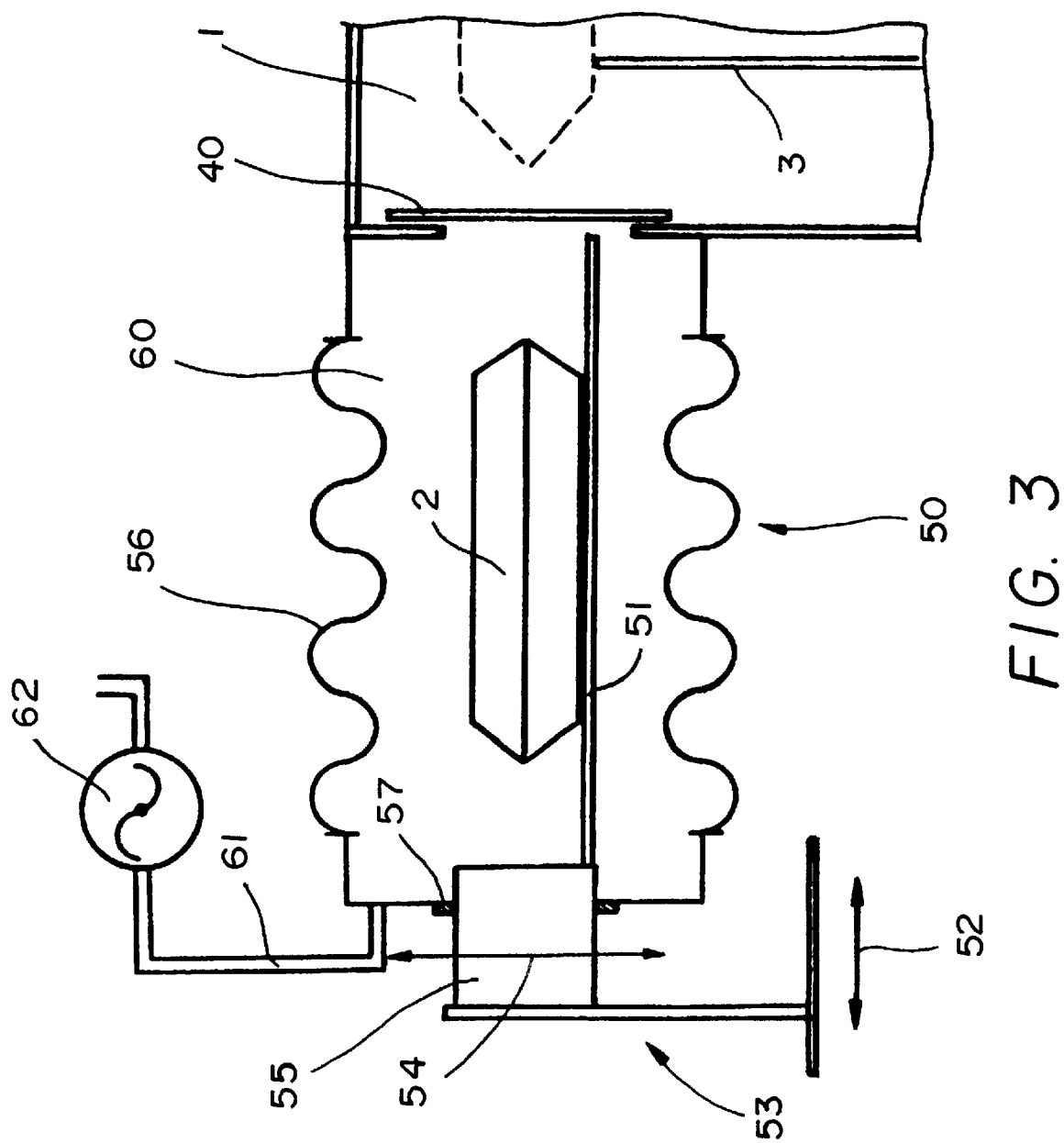
FIG. 3 is a flexible lock, which can be used with the two exemplary embodiments in FIGS. 1 and 2.

FIG. 3 shows the flexible lock 50. Its purpose ensues from the following method requirements when a coffin 2 has been burned, after approximately 60 to 90 minutes, the door 40 of the crematorium furnace 1 is opened (for example, lifted or pushed laterally by means of a motor). A further coffin 2 is introduced into the crematorium furnace 1 via a conveying device. If this is done without special precautions, natural air enters the crematorium chamber 1 in the process and can lead to the formation of nitrous oxides during the subsequent cremation. If preparations are made to prevent the entry of air into the crematorium chamber I during the charging process, the recirculation of the flue gas without the addition of $O_2$ and without operating the burners 5, 6 can be permitted to continue also during this changing process, i.e. the temperature in the crematorium chamber 1 can be kept at a high level (650 to 1000 degrees C) without negative consequences resulting therefrom, while at the same time a further energy saving effect is achieved by avoiding a reheating phase. Moreover, time is saved by this.

In the exemplary embodiment of FIG. 3 the flexible lock 50 is constituted in that—as already known per se—the coffin 2 rests on a slab 51. This slab can be displaced back and forth in the direction toward the door 40 (see the arrow 52), as well as up and down (see the arrow 54) by a lifting device 53. With the door 40 open, the coffin 2 is introduced into the crematorium chamber 1 by an appropriate movement of the slab 51 and placed on supports 3. The present invention now provides that a flexible bellows 56 is provided between the slab support 55 and the crematorium furnace in the area of the door 40, so that a closed space 60 is created around the coffin 2 during the charging process. Loading of the slab 51 with the coffin 2 is performed after a closure 57, which is only schematically indicated, is released. The space 60 inside the bellows 56 is connected via an air conduit 61 with an exhaust pump 62. in this way it can be provided that, in comparison to atmospheric pressure, a defined underpressure prevails in the space 60, which assures that no air from the space 60 is transferred into the crematorium furnace 1 when the door 40 is open.

What is claimed is:

1. A method for cremating bodies in coffins in a crematorium furnace, the crematorium furnace having a cremation chamber, a heat exchanger, mixers, a chimney, and a control unit comprising at least one temperature sensor, at least one burner, and a conduit for removing flue gas generated during cremation, the method comprising the steps of:

establishing a flue gas cycle whereby at least half of the flue gas leaving the crematorium furnace is recirculated to the crematorium chamber without being cooled;

admixing oxygen with the recirculated flue gas to effect cremation in the crematorium furnace without supplying any naturally occurring air;

the control unit maintaining the temperature of the cremation process within a predetermined range by regulating the supply of the recirculated flue gas/oxygen mixture to the at least one burner; and, switching off the at least one burner when, as a result of the energy made available by burning coffins with oxygen only being supplied via the mixture of oxygen and recirculated flue gas, the temperature in the crematorium furnace is sufficient for maintaining the cremation process.

2. The method as defied in claim 1, further comprising the steps of:

cooling the part of the recirculated flue gas admixed with oxygen in the heat exchanger; and conducting the cooled part of the recirculated flue gas admixed with oxygen to one of the mixers.

3. The method as defined in claim 2, wherein the cooled part of the recirculated flue gas admixed with oxygen is conducted to each of the mixers in which pure oxygen is admixed with the flue gas, further comprising the step of:

conducting the mixture formed in one mixer to the at least one burner, and conducting the mixture formed in the other mixer directly to the crematorium furnace.

4. The method as defined in claim 3, further comprising the steps of:

adjusting, independently of each mixer, the ratio of oxygen to flue gas in each mixer; and independently adjusting the amount of the recirculated flue gas which is conducted to each mixer.

5. The method as defined in claim 1, wherein the temperature range is 650° C. to 1000° C.

6. The method as defined in claim 1, further comprising the step of:

locating the heat exchanger in the path of the flue gas being conducted to the chimney.

7. The method as defined in claim 1, wherein the flue gas volume flow in the flue gas cycle is 400 Nm/h to 600 NM/h.

8. The method as defined in claim 1, further comprising the step of:

increasing, at the start of the cremation process, the portion of the mixture of oxygen and recirculated flue gas so that combustion free of carbon monoxide takes place, and taking into consideration the carbon supplied by the burning coffins.

9. The method as defined in claim 1, wherein the proportion of the recirculated flue gas is approximately three fourths of the total of the flue gas removed from the crematorium furnace.

10. The method as defined in claim 1, wherein the crematorium furnace additionally has a flexible lock defining a chamber for receiving a coffin, and a door which opens to communicate the defined chamber with the crematorium chamber, further comprising the step of:

charging the defined chamber with an underpressure for preventing entry of nitrogen-containing atmospheric air to the crematorium furnace.

11. The method as defined in claim 1, further comprising the step of:

maintaining the recirculation of the flue gas between the cremation of two coffins without the admixture of oxygen and without the supply of support energy.

12. The method as defined in claim 1, further comprising the step of supplying heat from the portion of the flue gas conducted to the chimney to a heat recovery device for heating purposes.

13. The method as defined in claim 1, further comprising the step of:

providing the heat exchanger in the conduit for the non-recirculated portion of the flue gas to the chimney.

14. The method as defined in claim 13, wherein the crematorium furnace further has a reactor and a baghouse filter, further comprising the steps of:

arranging the reactor downstream of the heat exchanger;

establish a flow stream between the reactor and the heat exchanger;

supplying into the flow stream adsorption agents for noxious materials contained in the flue gas flowing to the reactor; and cleaning out the noxious materials from the baghouse filter.

15. The method as defined in claim 1, further comprising the step of:

introducing coffins to be combusted individually, wherein, at the start of the cremation process, the coffins to be combusted themselves make more carbon available for burning than for the remainder of the cremation process.

16. An installation for cremating bodies contained in coffins, said installation comprising:

a crematorium furnace;

at least one burner to which fuel is supplied, said at least one burner mounted to a wall of said crematorium furnace;

a source of oxygen;

two mixers for creating a flue gas/oxygen mixture therein;

a conduit connected to said crematorium furnace for the removal of flue gas from said crematorium furnace;

a conduit connected to each of said mixers and to said flue gas removal conduit for recirculating flue gas to the respective mixers;

at least one temperature sensor connected to said crematorium furnace; and a control unit operably connected to said at least one temperature sensor for regulating the supply of the flue gas/oxygen mixture to said at least one burner so that the temperature in said crematorium furnace remains within a predetermined range, and so that said at least one burner is switched off when, as a result of the energy made available by burning coffins with oxygen only being supplied via the flue gas/oxygen mixture, the temperature for burning the coffins is achieved, wherein oxygen from said source of oxygen is 90% pure and is admixed with at least a part of the flue gas diverted for recirculation to one of said mixers, which admixture is supplied to said at least one burner, and wherein oxygen which is at least 99% pure is admixed with the other part of the flue gas diverted for recirculation to the other of said mixers and is supplied to said crematorium furnace.

17. The installation as defined in claim 16, further comprising:

a heat exchanger situated upstream of said two mixers for supplying a flue gas/oxygen mixture to said at least one burner.

18. The installation as defined in claim 17, further comprising:

a chimney, wherein said heat exchanger is arranged to conduct non-recirculating flue gas to said chimney.

19. The installation as defined in claim 16, further comprising:

adjustment means for independently adjusting the ratio of oxygen to flue gas in said mixers and the amount of recirculated flue gas conducted to said mixers.

* * * * *